United States Patent
Choi et al.

(10) Patent No.: US 11,161,921 B2
(45) Date of Patent: Nov. 2, 2021

(54) METHOD FOR PRODUCING POLYETHYLENE RESIN

(71) Applicant: LG Chem, Ltd., Seoul (KR)

(72) Inventors: Seung Won Choi, Daejeon (KR); Eun Jung Joo, Daejeon (KR); Ung Sagong, Daejeon (KR); Jung Seok Kwon, Daejeon (KR); Dae Young Shin, Daejeon (KR)

(73) Assignee: LG Chem, Ltd.

( * ) Notice: Subject to any disclaimer, the term of this patent is extended or adjusted under 35 U.S.C. 154(b) by 195 days.

(21) Appl. No.: 16/478,313

(22) PCT Filed: Oct. 15, 2018

(86) PCT No.: PCT/KR2018/012128
§ 371 (c)(1),
(2) Date: Jul. 16, 2019

(87) PCT Pub. No.: WO2019/078561
PCT Pub. Date: Apr. 25, 2019

(65) Prior Publication Data
US 2019/0367643 A1    Dec. 5, 2019

(30) Foreign Application Priority Data

Oct. 19, 2017 (KR) .................. 10-2017-0135928
Oct. 12, 2018 (KR) .................. 10-2018-0121995

(51) Int. Cl.
*C08F 2/00*    (2006.01)
*C08F 2/34*    (2006.01)
*C08F 2/44*    (2006.01)
*C08F 10/02*   (2006.01)
*C08K 5/14*    (2006.01)

(52) U.S. Cl.
CPC ............ *C08F 2/001* (2013.01); *C08F 2/34* (2013.01); *C08F 2/44* (2013.01); *C08F 10/02* (2013.01); *C08K 5/14* (2013.01)

(58) Field of Classification Search
USPC .............................................. 526/65; 525/53
See application file for complete search history.

(56) References Cited

U.S. PATENT DOCUMENTS

2007/0037937 A1    2/2007  Damme
2008/0125553 A1    5/2008  Conrad et al.
(Continued)

FOREIGN PATENT DOCUMENTS

CN    1922219 A      2/2007
CN    101072800 A    11/2007
(Continued)

OTHER PUBLICATIONS

Extended European Search Report including Written Opinion for Application No. EP18868021.9 dated Feb. 14, 2020.
(Continued)

*Primary Examiner* — Fred M Teskin
(74) *Attorney, Agent, or Firm* — Lerner, David, Littenberg, Krumholz & Mentlik, LLP

(57) ABSTRACT

The present invention provides a method for producing a polyethylene resin in which gel or fish eye formation is greatly reduced, by controlling various reaction conditions such as the supply flow rate ratio of the monomers to each reactor, the temperature range of each reactor, and the temperature range of the mixing region, in the method for producing a polyethylene resin which is applied to produce a polyethylene resin for a protective film of display.

9 Claims, 1 Drawing Sheet

(56) References Cited

U.S. PATENT DOCUMENTS

| | | |
|---|---|---|
| 2010/0093961 A1 | 4/2010 | Aerts et al. |
| 2012/0252990 A1 | 10/2012 | Berbee et al. |
| 2013/0197168 A1 | 8/2013 | Berbee et al. |
| 2014/0187730 A1 | 7/2014 | Flory et al. |
| 2014/0275462 A1 | 9/2014 | Yang et al. |
| 2014/0303309 A1 | 10/2014 | Berbee et al. |
| 2015/0210785 A1 | 7/2015 | Nummila-Pakarinen et al. |
| 2015/0299493 A1 | 10/2015 | Karjala et al. |
| 2016/0115256 A1 | 4/2016 | Berbee et al. |
| 2016/0280821 A1 | 9/2016 | Liu et al. |

FOREIGN PATENT DOCUMENTS

| | | |
|---|---|---|
| CN | 101679232 A | 3/2010 |
| CN | 105814100 A | 7/2016 |
| EP | 2855537 B1 | 7/2017 |
| JP | S6210119 A | 1/1987 |
| JP | 2003231759 A | 8/2003 |
| JP | 200499875 A | 4/2004 |
| JP | 2016508175 A | 3/2016 |
| KR | 20070099270 A | 10/2007 |
| KR | 100857963 B1 | 9/2008 |
| KR | 20120115323 A | 10/2012 |
| KR | 101692123 B1 | 1/2017 |
| WO | 2012044504 A1 | 4/2012 |
| WO | 2014000726 A2 | 1/2014 |
| WO | 2014164498 A2 | 10/2014 |

OTHER PUBLICATIONS

Search report from International Application No. PCT/KR2018/012128, dated Jan. 30, 2019.

Chinese Search Report for Application No. 201880005241.1, dated Apr. 26, 2021, 3 pages.

METHOD FOR PRODUCING POLYETHYLENE RESIN

CROSS-REFERENCE TO RELATED APPLICATION(S)

The present application is a national phase entry under 35 U.S.C. § 371 of International Application No. PCT/KR2018/012128 filed on Oct. 15, 2018, which claims priority from Korean Patent Application No. 10-2017-0135928 filed on Oct. 19, 2017 and Korean Patent Application No. 10-2018-0121995 filed on Oct. 12, 2018, the entire contents of which are incorporated herein by reference.

TECHNICAL FIELD

The present invention provides a method for producing a polyethylene resin in which gel or fish eye formation is greatly reduced by controlling the reaction conditions and the like in each reactor, in the method for producing a polyethylene resin which is applied to produce a polyethylene resin for a protective film of display.

BACKGROUND

High added-value low density polyethylene resin used as a main raw material for IT protective film such as a protective film of display is generally produced by high-pressure polymerization of an ethylene monomer at a temperature of 150° C. or more under a pressure of 2200 bar or more. The polymerization reaction of such a low-density polyethylene resin can be carried out by radical polymerization, and oxygen gas, organic peroxide and the like can be used as the reaction initiator.

More specifically, the polyethylene resin may be produced by reacting an ethylene monomer and a reaction initiator at a high temperature and a high pressure in two tubular reactors, and unreacted ethylene monomers can be recovered and re-introduced into the reactor. The maximum conversion rate in this process is known to be about 30% in combination of the two reactors.

However, the polyethylene resin produced through such a process contains some gels by the high-temperature oxidation reaction during the polymerization process, and this gel induces the generation of fish eyes on the surface of the film during film forming. As these fish eyes become larger, scratches are induced on the surface of the display to be protected, or tears may occur by the defect of the film itself and may not function as a protective film. Therefore, in the production of the above-mentioned polyethylene resin, reducing the generation of gels (i.e., "oxidized polyethylene oxide gels") by high temperature oxidation during the polymerization process has been emerging as one of the important tasks.

As one of conventional techniques for reducing the generation of these oxidized polyethylene gels, a method of injecting an organic peroxide initiator several times without using oxygen gas as a reaction initiator has been developed. However, this method has an advantage that the generation of gels and/or fish eyes by high temperature oxidation can be suppressed to some extent. However, this is a method which is difficult to apply because reinforcement of facilities such as high-pressure injection equipment should be performed, and carbide may be generated during the control of the polymerization temperature.

Technical Problem

The present invention provides a method for producing a polyethylene resin in which gel or fish eye formation is greatly reduced even without changing initiators or changing existing facilities, by controlling the reaction conditions and the like in each reactor, in the method for producing a polyethylene resin which is applied to produce a polyethylene resin for a protective film of display.

Technical Solution

According to one embodiment of the invention, a method for producing a polyethylene resin is provided including a step of producing a polyethylene resin by conducting radical polymerization while supplying an initiator containing oxygen gas and an organic peroxide, and an ethylene monomer to the first and second polymerization reactors, wherein the radical polymerization is carried out under the polymerization conditions of the following Formulas 1 to 3:

$$0.4 < S/R < 0.5 \quad \text{[Formula 1]}$$

in Equation 1, R represents the total flow rate of the ethylene monomer supplied to the first and second polymerization reactors, and S represents the flow rate of the ethylene monomer supplied to the first polymerization reactor, $$\theta_1 > 0.5 \quad \text{[Formula 2]}$$

wherein, $\theta_1$ represents "(the maximum temperature in the first reactor—the temperature of the mixing region where the polyethylene resin-containing product formed in the first reactor and the newly introduced ethylene monomer are mixed)/the maximum temperature in the first reactor", $$\theta_2 > 0.8 \quad \text{[Formula 3]}$$

wherein, $\theta_2$ represents "(the maximum temperature in the second reactor—the temperature of the mixing region where the polyethylene resin-containing product formed in the first reactor and the newly introduced ethylene monomer are mixed)/the temperature of the mixing region".

Hereinafter, a method for producing a polyethylene resin according to an embodiment of the present invention will be described in detail.

According to the above-described production method of the one embodiment, in the process of producing a polyethylene resin to which a plurality of reactors are applied, various reaction conditions such as the supply flow rate ratio of the monomers to each reactor, the temperature range of each reactor, and the temperature range of the mixing region are controlled so as to satisfy the Equations 1 to 3 at the same time.

In a more specific example, in the production method of the one embodiment, a polymerization step for producing the polyethylene resin can be carried out under the reaction conditions further satisfying the following Formula 4, together with the Formulas 1 to 3:

$$\theta_3 > 0.95 \quad \text{[Formula 4]}$$

wherein $\theta_3$ represents "(the maximum temperature in the first reactor—the inlet temperature of the first reactor)/the inlet temperature of the first reactor".

In these various reaction conditions, Formula 1 can define the monomer supply flow ratio and reaction ratio of each reactor. Formula 2 can define the temperature condition of the heat removal section of the first reactor. Further, Formulas 3 and 4 can define the temperature condition of the polymerization section in the second reactor and the first reactor, respectively.

As a result of continuous experiments conducted by the present inventors, it has been found that by controlling the reaction ratio in each of these reactors and the temperature conditions in the polymerization section and the heat removal section, the generation of gels (i.e., "oxidized polyethylene oxide gels") due to high-temperature oxidation in the polymerization process can be greatly reduced, and as a result, the generation of fish eyes could be suppressed. This is presumably because, while the polymerization reaction in each reactor is activated due to the high maximum temperature in each reactor, heat removal in the heat removal section is well performed, and thus, the high temperature oxidation of the polyethylene resin may be suppressed.

In particular, according to the method of one embodiment, even if oxygen gas is directly used as a reaction initiator and facilities such as a high-pressure injection device is not reinforced, the generation of oxidized polyethylene gels and fish eyes can be greatly suppressed. Therefore, with a simplified process and a low unit price, a polyethylene resin for a protective film of display can be produced with a high quality.

Hereinafter, the production method of one embodiment will be described in more detail for each step.

In the above-described production method of the embodiment, it is possible to control the respective reaction conditions of Formulas 1 to 4 within a specific range.

In a more specific example, the S/R defined in Formula 1 may be more than 0.4 and less than 0.5, or 0.42 or more and 0.49 or less, or 0.43 or more and 0.48 or less. Further, the $\theta 1$ defined in Formula 2 may be more than 0.5, or more than 0.5 and 0.6 or less, or 0.51 or more and 0.58 or less, or 0.52 or more and 0.56 or less, the $\theta 2$ defined in Formula 3 may be more than 0.8, or more than 0.8 and less than 1, or 0.83 or more and 0.99 or less, or 0.85 or more and 0.98 or less, and the $\theta 3$ defined in Formula 4 may be more than 0.95, or more than 0.95 and less than 1.2, or 0.97 or more and 1.15 or less, or 0.98 or more and 1.1 or less.

By controlling the various reaction conditions of the Formulas 1 to 4 within the above-described range, it is possible to further suppress the generation of polyethylene oxide gels and fish eyes, while maintaining excellent conversion rate of the polyethylene resin.

On the other hand, the production method of one embodiment includes a plurality of reactors including first and second reactors, and can be carried out in a reaction apparatus including a mixing region located between the first and second reactors. For reference, the FIGURE is a scheme illustrating a schematic configuration of a reaction apparatus in which a method for producing a polyethylene resin according to one embodiment is carried out.

In such a reaction apparatus, in the first and second reactors, a radical polymerization can be carried out while a reaction initiator including oxygen gas and an organic peroxide, and an ethylene monomer in a gaseous state are continuously supplied. a reaction initiator including oxygen gas and an organic peroxide, and an ethylene monomer in a gaseous state are continuously supplied. Through such radical polymerization, polyethylene resin-containing products can be produced in the first and second reactors, respectively. More specifically, as shown in the FIGURE, the ethylene monomers and the like supplied to the first reactor are partially divided and supplied, and radical polymerization is carried out in the first reactor. The remaining divided ethylene monomers and the like are supplied to the mixing region in the rear stage of the first reactor.

On the other hand, the polyethylene resin-containing product produced as a result of the radical polymerization of the first reactor is discharged to the mixing region, and in the mixing region, it may be mixed with an ethylene monomer or the like divided in the front stage of the first reactor. The polyethylene resin-containing product and the ethylene monomer and the like thus mixed are supplied to the second reactor, and the radical polymerization is again carried out in the second reactor.

As a result, the final polyethylene resin-containing product is formed from the second reactor, and unreacted ethylene monomers contained in such product may be separated/recovered, and then re-introduced and reused in the polymerization reactor.

And, the radical polymerization in the first and second reactors may be carried out by the high-temperature/high-pressure polymerization process at a temperature of 150° C. or more, 150 to 350° C. under a pressure of 2200 bar or more, or 2200 to 3000 bar, depending on the conventional polymerization reaction conditions applied to produce the polyethylene resin for the protective film of display.

In this polymerization reaction step, in order to satisfy the aforementioned reaction condition of Formula 1, the flow rate of the monomers supplied to the first polymerization reactor may be 20,000 to 30,000 kg/hr, or 22,000 to 28,000 kg/hr, or 24,000 to 28,000 kg/hr, and the total flow rate of the monomers and polyethylene resin supplied to the second polymerization reactor can be 48,000 to 62,000 kg/hr, or 50,000 to 60,000 kg/hr, or 52,000 to 58,000 kg/hr.

Further, in order to satisfy the respective reaction conditions of Formulas 2 to 4 described above, the maximum temperature in the first reactor may be controlled to 270 to 340° C., or 280 to 330° C., or 290 to 310° C., and the maximum temperature in the second reactor may be controlled to 260 to 320° C., or 270 to 310° C., or 275 to 300° C. The inlet temperature of the first reactor may be controlled to 140 to 170° C., or 145 to 165° C., or 147 to 160° C., and the inlet temperature of the second reactor can be controlled to 170 to 220° C., or 170 to 210° C., or 180 to 210° C. In addition, the temperature of the mixing region where the polyethylene resin-containing product formed in the first reactor and the newly introduced ethylene monomer are mixed can be controlled to 140 to 180° C., 140 to 180° C., or 140 to 160° C.

By satisfying each of these conditions, the radical polymerization in each reactor becomes efficient and the generation of polyethylene oxide gels and fish eyes can be further suppressed while the conversion rate of the polyethylene resin is excellently maintained.

On the other hand, except for the various reaction conditions described above, the polyethylene resin can be finally obtained by carrying out steps such as purification, depending on the typical configuration of the process applied to produce the polyethylene resin for the protective film of the display, and thereby, it is possible to obtain a low-density polyethylene resin to be applied for a protective film of display having excellent physical properties and the like.

The polyethylene resin-containing product obtained through the method of this embodiment may include a polyethylene resin, unreacted ethylene monomer, and oxidized polyethylene gel. The oxidized polyethylene gel includes less than 10, or less than 7, or 1 to 5 of the entire products, and can exhibit excellent physical properties.

On the other hand, the number of the oxidized polyethylene gel can be confirmed by forming the polyethylene resin-containing product into a film state, and then visually observing and analyzing such film with a laser analyzer and an optical detector, and its specific identification/measurement method is described in Examples provided later.

The polyethylene resin obtained by the method of one embodiment described above may induce scratches on the surface of the display surface to be protected, and it can be very preferably used for a display protective film and the like, while greatly reducing the risk of tearing due to a defect in the film itself.

Advantageous Effects

As described above, the present invention can provide a method for producing a polyethylene resin in which gel or fish eye formation is greatly reduced even without changing initiators or changing existing facilities, by controlling the reaction conditions and the like in each reactor, in the method for producing a polyethylene resin which is applied to produce a polyethylene resin for a protective film of display.

BRIEF DESCRIPTION OF THE DRAWING

The FIGURE is a scheme illustrating a schematic configuration of a reaction apparatus in which a method for producing a polyethylene resin of one embodiment is carried out.

DETAILED DESCRIPTION OF THE EMBODIMENTS

Hereinafter, preferred examples are presented to facilitate understanding of the present invention. However, the following examples are given for illustrative purposes only, and the scope of the present invention is not intended to be limited to or by these examples.

Examples 1 to 4, Comparative Examples 1 and 2: Preparation of Polyethylene

A polyethylene resin was produced in a reaction apparatus that has a tubular reactor of the first and second reactors, and has a mixing region connected to these first and second reactors in which the polyethylene resin-containing products formed in the respective first and second reactors were mixed.

First, the ethylene monomer compressed through a compressor was preheated to the inlet temperature of each reactor, and then injected into the first and second reactors, respectively. Oxygen gas and organic peroxide were injected together with these monomers were injected into each reactor (substance name: tert-butyl peroxypivalate; please fill in the specific substance name), and the total amount used was oxygen gas: 0.5 kg/h, organic peroxide: 40 L/h.

In the first and second reactors, the flow rate of the ethylene monomer supplied to the first and second reactors, the inlet temperature of the first and second reactors, the maximum temperature in the first and second reactors, and the temperature of the mixing region were controlled as summarized in Table 1 below. The reaction conditions of Formulas 1 to 4 calculated therefrom are summarized and shown together in Table 1 below.

Thereby, radical polymerization was carried out in the first and second reactors, respectively, and the progressing pressure of this polymerization reaction was 2300 bar. Through the control of these reaction conditions, polymerization reaction progressed in each reactor to obtain a product containing unreacted monomer, polyethylene resin and gel. These products were mixed in a mixing region and then discharged. The number of oxidized polyethylene gels (fish eyes) contained in the total product from the discharged products was calculated by a method of forming the film of the polyethylene resin sample and then counting by using an optical detector and a laser analyzer. The results are shown in Table 1 below.

More specifically, using a single screw extruder (Dr. Collin Co. Teachline E20T), the pellet of the product containing the polyethylene resin was produced into a casting film (54 mm*33 m; thickness: 500 μm) for gel analysis at 190° C. for 10 minutes. Except for the edge of the film, the number of gels generated in a 1 m² area (about 30 mm*about 33 m) was measured with an optical detector and laser analyzer attached to the extruder. This process was repeated three times, and the average value was taken as the number of gels. At this time, the gel was visually confirmed by the optical detector, while in the laser analyzer, the region where the difference in refractive index from the rest of the film occurred was defined as gel. The number of gels having a particle diameter of 250 μm or more and less than 350 μm was counted.

On the other hand, the unreacted ethylene monomer was separated from the polymerization product by a method of volatilizing the monomer in a high temperature and depressurizing process, and re-introduced and reused into the first and second reactors. The conversion rates of the polyethylene resins obtained through the above reaction process are shown in Table 1 below.

TABLE 1

| Process condition | Example 1 | Example 2 | Example 3 | Example 4 | Comparative Example 1 | Comparative Example 2 |
|---|---|---|---|---|---|---|
| Monomer supply flow rate (first reactor; ton/h) | 24 | 25 | 25 | 26 | 29 | 30 |
| Monomer supply flow rate(second reactor; ton/h) | 31 | 30 | 30 | 29 | 26 | 25 |
| Inlet temperature of first reactor (° C.) | 154 | 147 | 153 | 155 | 163 | 157 |
| Inlet temperature of second reactor (° C.) | 193 | 206 | 195 | 190 | 211 | 216 |
| Maximum temperature of first reactor(° C.) | 308 | 308 | 306 | 306 | 316 | 311 |
| Maximum temperature of second reactor(° C.) | 275 | 281 | 284 | 282 | 285 | 272 |
| Temperature of mixing region | 148 | 148 | 144 | 144 | 161 | 165 |
| Formula 1 | 0.44 | 0.45 | 0.45 | 0.47 | 0.53 | 0.55 |
| Formula 2($\theta$1) | 0.52 | 0.52 | 0.53 | 0.53 | 0.49 | 0.47 |
| Formula 3($\theta$2) | 0.86 | 0.90 | 0.97 | 0.96 | 0.77 | 0.65 |
| Formula 4($\theta$3) | 1.0 | 1.1 | 1.0 | 0.98 | 0.94 | 0.98 |
| Fish eye(number/g) | 3.3 | 1.8 | 2.0 | 2.5 | 24.3 | 41.8 |

Referring to Table 1, it was confirmed that the generation of polyethylene oxide gels (fish eyes) can be minimized in the polymerization method of Examples in which the reaction conditions are optimized.

The invention claimed is:

1. A method for producing a polyethylene resin comprising:
   conducting radical polymerization while supplying an initiator containing oxygen gas and an organic peroxide, and an ethylene monomer to a first and a second polymerization reactor connected in series with a mixing region disposed between them,
   wherein the radical polymerization is carried out under polymerization conditions of the following Formulas 1 to 3:

$0.4 < S/R < 0.5$      [Formula 1]

in Equation 1, R represents a total flow rate of the ethylene monomer supplied to the first and second polymerization reactors, and S represents a flow rate of the ethylene monomer supplied to the first polymerization reactor, $$\theta1 > 0.5 \qquad [\text{Formula 2}]$$

wherein, θ1 represents (a maximum temperature in the first polymerization reactor—a temperature of a mixing region where a polyethylene resin-containing product formed in the first polymerization reactor and a newly introduced ethylene monomer are mixed)/the maximum temperature in the first polymerization reactor, $$\theta2 > 0.8 \qquad [\text{Formula 3}]$$

wherein, θ2 represents (a maximum temperature in the second polymerization reactor—the temperature of the mixing region where the polyethylene resin-containing product formed in the first polymerization reactor and the newly introduced ethylene monomer are mixed)/the temperature of the mixing region.

2. The method for producing a polyethylene resin according to claim 1, wherein the radical polymerization is carried out under reaction conditions further satisfying the following Formula 4:

$$\theta3 > 0.95 \qquad [\text{Formula 4}]$$

wherein θ3 represents (the maximum temperature in the first polymerization reactor an inlet temperature of the first polymerization reactor)/the inlet temperature of the first polymerization reactor.

3. The method for producing a polyethylene resin according to claim 1, wherein the radical polymerization is carried out by high-pressure polymerization at a temperature of 150° C. or more under a pressure of 2200 bar or more.

4. The method for producing a polyethylene resin according to claim 1, wherein the flow rate of the ethylene monomer supplied to the first polymerization reactor is 20,000 to 30,000 kg/hr, and a total flow rate of the ethylene monomer and polyethylene resin-containing product supplied to the second polymerization reactor is 48,000 to 62,000 kg/hr.

5. The method for producing a polyethylene resin according to claim 1, wherein the maximum temperature in the first polymerization reactor is 270 to 340° C., and the maximum temperature in the second polymerization reactor is 260 to 320° C.

6. The method for producing a polyethylene resin according to claim 1, wherein the temperature of the mixing region where the polyethylene resin-containing product formed in the first polymerization reactor and the newly introduced ethylene monomer are mixed is 140 to 180° C.

7. The method for producing a polyethylene resin according to claim 2, wherein the inlet temperature of the first polymerization reactor is 140 to 170° C., and an inlet temperature of the second polymerization reactor is 170 to 220° C.

8. The method for producing a polyethylene resin according to claim 1, wherein the polyethylene resin-containing product includes a polyethylene resin, an unreacted ethylene monomer, and an oxidized polyethylene gel, and a number of the oxidized polyethylene gel is less than 10 of the entire polyethylene resin-containing product.

9. The method for producing a polyethylene resin according to claim 8, wherein the unreacted ethylene monomer is re-introduced and reused into the first and second polymerization reactors.

* * * * *